May 22, 1934.  A. P. FOX ET AL  1,959,529
COUPLER
Filed Jan. 12, 1933

Alexander P. Fox,
William Z. Linders,
Inventors.
Delos G. Haynes,
Attorney.

Patented May 22, 1934

1,959,529

UNITED STATES PATENT OFFICE 1,959,529

COUPLER

Alexander P. Fox, University City, and William Z. Linders, Normandy, Mo., assignors to Lincoln Engineering Company, St. Louis, Mo., a corporation of Missouri Application January 12, 1933, Serial No. 651,290

2 Claims. (Cl. 285—161)

This invention relates to couplers, and with regard to certain more specific features to an improved type of coupler for pressure lubrication.

This invention is an improvement upon the invention set forth in the patent application of Frank S. Barks, Serial No. 531,440, filed April 20, 1931, for Coupler.

Among the several objects of the invention may be noted the provision of a coupler for pressure lubrication systems adapted to provide a lapped sealing connection between said coupler and a fitting with less reaction at a given pressure; and, the provision of a coupler of the class described which provides an improved mount for the member with respect to the lapping seal. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

Figure 1:
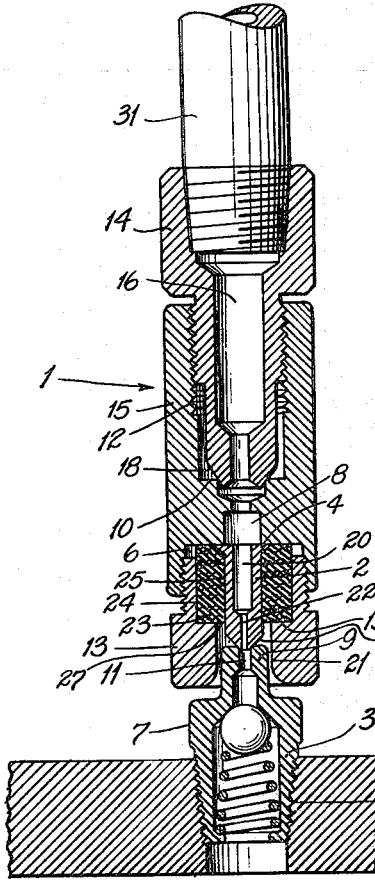
Figure 3:
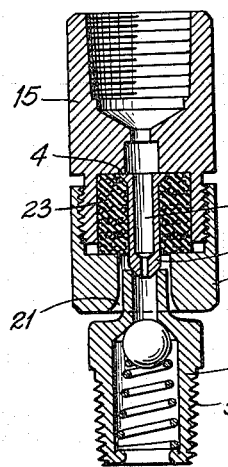
Figure 2:
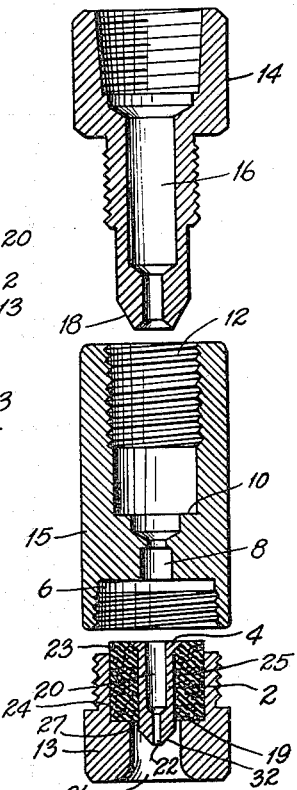
Figure 5:
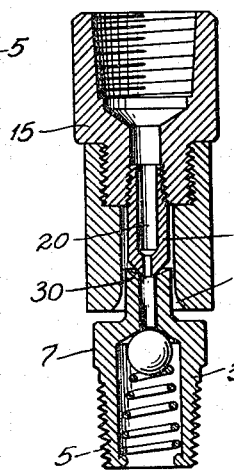
Figure 4:
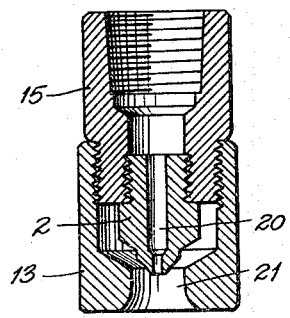
Figure 6:
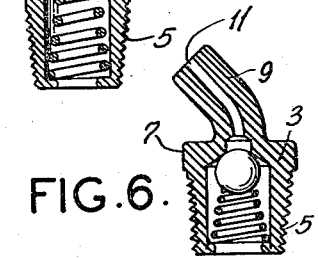

In the accompanying drawing, in which is illustrated several of various possible embodiments of the invention, Fig. 1 is an axial section of a coupler applied to a push type of fitting;

Fig. 2 is a view of the parts of Fig. 1 shown separated;

Figs. 3, 4, and 5 are views similar to Fig. 1 showing alternative constructions; and, Fig. 6 is an axial section showing an angular form of fitting.

Similar reference characters indicate corresponding parts throughout the several views of the drawing.

Referring now more particularly to Fig. 1, there is shown at numeral 1 a coupler applicable by axial force to a push type of fitting 3 to effect a seal between the coupler and the fitting, said fitting and coupler being adapted to be used more particularly in high pressure lubrication systems, although being also useful with lower pressures.

The fitting 3 comprises a hollow member provided with threads at one end as shown at numeral 5, for threading the fitting into a bearing member to be lubricated. The fitting 3 is also provided with a wrench receiving, polygonal portion 7, and at its other end with a receiving portion 9. The inlet of the fitting 3 is shown at numeral 11 and is ordinarily of the order of $\frac{1}{16}$ to $\frac{1}{8}$ inch in diameter.

The coupler 1 comprises a sleeve 13 and a body 15. The sleeve 13 has a counterbore 24 which terminates at a shoulder 19 at which a concentric opening 21 begins. The opening 21 is shaped to freely receive the portion 9 of the fitting 3.

A packing 23, which has a passage 25 therethrough, is positioned in the counterbore 24 and is seated against the shoulder 19 and is thus prevented from moving farther into the member 13. The passage 25 is sufficiently small to provide an edge 27 which overlaps the narrower portion of the opening 21, as shown in Figs. 1 and 2.

The packing 23 is preferably composed of a resilient, grease-resisting composition comprising relatively thin, alternate layers of canvas and rubber, the planes of which are normal to the axis of the device. The composition effects a uniform radial expansion throughout its length when stresses are applied parallel to its axis. However, other relatively soft packings may be used.

The entire length of the passage 25 is taken up with a small nipple 2 having an upwardly located bevelled flange 4. The flange 4 on its upper surface is flat and flush with the upper surface of the packing 23. By this means there is presented to the flat bottom of a counterbore 6 of the body 15, a flat face constituting the upper surface of the packing 23 and of the flange 4. Thus, when the members 13 and 15, the former being threaded exteriorly and the latter interiorly, are threaded together, the packing 23 is jammed so as to effect a radial seal against the nipple 2 and the recess 24, an endwise seal against the inner end of the counterbore 6, and an endwise seal against the shoulder 19.

The body 15 above the position of the nipple 2 is provided with a passage 8, a shoulder 10, and a threaded recess 12, into which recess is threaded a second and larger form of nipple 14, the latter threadably receiving tubing 31 which communicates with known pressure lubricating system or apparatus. The nipple 14 has a passage 16 communicating with the passage in the tubing 31 and a bevelled lower end 18 adapted to cooperate with said shoulder 10 to effect a seal.

As shown in Fig. 2 the nipple 14 is separable from the body 15 and in its separated condition may be used as a pressure nozzle for delivering lubricant to desired openings, particularly to those larger than those in fittings such as 3. When the nipple 14 is connected (Fig. 1), it forms a part of the body 15, that is, when the device is to be used on a fitting such as 3.

The small nipple 2, for attachment to fittings such as 3, has a passage 20 for communication with the passage 8 with which it aligns. The outlet 22 of the passage 20 is quite small. As shown above, fittings such as 3 as now supplied on the market have a quite small inlet 11. The lower end of the nipple 2 is provided with a tapered portion 32 by means of which the nipple 2 may be entered within the inlet passage 11 of the fitting 3. The taper is preferably of the order of 45 degrees. The outlet passage 22 of the nipple 2 is made smaller than the inlet 11 of the fitting 3. The inlet passage 11 being of the order of one-sixteenth to one-eighth of an inch in diameter, the passage 22 will be smaller than this dimension so that an interior lap is effected between the bevel 32 and the inlet of the fitting 3. The advantage of this is that there is a lap seal between the nipple 2 and the fitting.

As an example, as high as seven thousand pounds per square inch has been positively sealed without the effort required to hold two thousand pounds per square inch with the conventional push type of nozzle. This is attributed to the fact that manual effort is exerted only to overcome the reaction of the unit pressure developed over the area of the hole in the fitting instead of any greater amount. The arrangement provides for sealing, such that the very minimum amount of area shall be subjected to pressure.

In Fig. 2 is shown the separation of the members 13 and 15. The parts may be thus separated when it is desired to remove the nipple 2 and replace the same. All that is necessary is to push it and the retaining packing 23 from the counterbore 24 of the separated member 13. The nipple 2 may then be removed from the packing 23 and a new nipple inserted in the packing and the packing returned to the member 13. The parts 13 and 15 are then screwed together; or, a complete new packing and nipple assembly may be replaced.

An advantage is that the nipple 2, which in view of the interior application to the fitting 3, must be rather small, does not require threads to be placed thereon, the same being supported by the resilient packing. Ordinarily, it is difficult to place small and strong threads on members of this nature, particularly where they must be concentric. Furthermore, the support of the nipple 2 by the packing 23 permits of some eccentricity of the nipple 2 because it will self-align with respect to the fitting 3.

In Fig. 3 is shown a modification in which the advantages of Figs. 1 and 2 are attained, but instead of threading the member 13 exteriorly and the member 15 interiorly for joining the same, the interior threads are placed on the member 13 and the exterior threads are placed on the member 15. By this means, the threads are sealed against leakage by a greater area of packing than is the case in the forms in Figs. 1 and 2. It will be noted that the cylindrical sides of the packing are effective to protect the threads, as well as the upper end of the packing; whereas in Figs. 1 and 2, only the upper end of the packing is effective in aiding in effecting a seal against leakage through the threads.

In Fig. 4 is shown a packless form of the invention wherein the members 13 and 15 are threaded together and the nipple 2 is threaded into the body 15. It is preferable in this event to make the body of the nipple 2 somewhat larger and heavier so as to accommodate a somewhat coarser thread. Hence manufacture is easier. A straight, shouldered thread is used in this form. It retains many of the functional advantages of the form of Figs. 1 and 2, but not the manufacturing advantages, nor the self-aligning feature.

In Fig. 5 is shown the manufacture of another packless form of the invention wherein smaller taper threads are used for joining the nipple 2 and the body 15. It will be appreciated that this form may be practicable under certain manufacturing conditions, but it is believed that the forms in Figs. 1, 2 and 3 are the most practicable.

All forms have the advantage of the spacing of the nipple 2 from the inner walls of the recess 21; also the lap seal and reduced pressure reaction.

From the above it will be seen that the invention has many advantages. It also has the advantage in effecting a seal against the inside edge of the inlet of the fitting. This means that the sealing engagement is made with a seat of the fitting which is not subjected to damage. Fittings are very frequently rendered faulty and useless by damage to the outside sealing seat occasioned by abrasions, nicks or distortion. The slightest irregularity along the line of contact between the fitting and the coupler will result in excessive leakage at the extremely high pressures handled. By means of the present invention a line of contact is used which is not subjected to abrasion and the like.

To afford further protection to the sealing edge of the fitting the end may be provided with the shallow countersunk portion 30 (Fig. 5), (of any desirable sectional contour) by means of which the sealing edge itself is in a plane depressed from the face of the fitting, where it is protected against surface scratches or marks which might otherwise disturb the sealing edge when it is flush with the fitting face.

A further practical advantage which results with this form of coupler is the fact that it does not permit of being applied at an angle with respect to the fitting, but must of necessity be applied substantially straight on the fitting. The advantage in this lies in the fact that the most effective seal is to be had only when couplers are applied substantially straight. Thus each fitting is contacted by pressure on a straight line perpendicular to its face, and where angular entries of the coupler must be made, special fittings are provided such as shown in Fig. 6.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

1. A coupler comprising a body portion having an opening therethrough and a counterbore therein, packing material in the counterbore, a nipple supported by the packing material and passing therethrough, and a member threaded to the body and adapted to compress said packing, said last-named member having a recessed portion surrounding a portion of the nipple extending from the packing, said extended portion of the nipple having a conical end and an opening therethrough which is smaller than the opening of the fitting against which the coupler is adapted to be pressed.

2. A coupler comprising a body portion having an opening therethrough and a counterbore therein, packing material in the counterbore, a nipple supported by the packing material and passing entirely therethrough, a member threaded to the body adapted to compress said packing, said nipple having a wall adapted to withstand any substantial inward movement of the packing under compression, said threaded member having a recess portion surrounding a portion of the nipple extending from the packing, said extended portion of the nipple having a conical end and an opening therethrough which is smaller than the opening of the fitting against which the coupler is adapted to be pressed, the extension of the nipple being adapted to prevent the fitting from contacting with said packing.

ALEXANDER P. FOX.
WILLIAM Z. LINDERS.